Patented May 13, 1952

2,596,175

UNITED STATES PATENT OFFICE 2,596,175

TREATING HYDROCARBONS WITH ALKALI METAL HYDROXIDES

Ludwig Rosenstein, San Francisco, Calif., assignor to Texaco Development Corporation, New York, N. Y., a corporation of Delaware No Drawing. Application October 28, 1948, Serial No. 57,121

6 Claims. (Cl. 196—32)

This invention is concerned with certain improvements in the treating of hydrocarbons with alkali metal hydroxides and contemplates treating the hydrocarbons with homogeneous colloidal dispersions of alkali metal hydroxides and hydrocarbons.

Aqueous alkali metal hydroxides such as sodium and potassium hydroxides have found application in a variety of methods for the treatment of hydrocarbons, including normally gaseous hydrocarbons and normally liquid hydrocarbons. This invention is concerned with improving the efficiency of the treatment by employing the hydroxide reagents in the form of homogeneous colloidal dispersions in hydrocarbon.

The preparation of the alkali metal hydroxide reagent is based on the discovery that with the aid of peptizing agents a mixture of the hydroxide and hydrocarbon may be caused to enter into a colloidal state. It is not known definitely whether the hydroxide or the hydrocarbon constitutes the continuous phase of the colloidal dispersion. While it is possible that the alkali metal hydroxide may form some type of structure tending to give rigidity it seems probable that the hydroxide does not constitute the extended or continuous phase at least in bulk; known colloidal dispersions of liquids in solids are in the form of solid, rigid bodies. As a practical matter the hydroxide is distributed in the hydrocarbon mass to form a clear, transparent sol or gel and consequently it appears accurate to speak of colloidally dispersing the hydroxide in hydrocarbon.

The peptizing agents which serve the function of colloidally dispersing the alkali metal hydroxide in hydrocarbon include the metallic salts of organic acids which are soluble or dispersible in hydrocarbons, such as the salts of high molecular weight saturated and unsaturated fatty acids, naphthenic acids, sulfonic acids and the like. By means of these dispersing agents a clear homogeneous gel or sol of the hydroxide and hydrocarbon may be formed which is stable and adapted as a reagent for the treatment of hydrocarbons.

One aspect of the invention involves the treatment of hydrocarbons with the alkali metal hydroxide reagent prepared as a substantially anhydrous homogeneous colloidal dispersion of the hydroxide and hydrocarbon. Such colloidal dispersions are far more reactive in many cases in the treatment of hydrocarbons than aqueous solutions of alkali metal hydroxides.

In accordance with the invention normally gaseous hydrocarbons or liquid hydrocarbons, including particularly petroleum oils such as gasoline, naphtha, kerosene and lubricating oils, are treated with reagents comprising homogeneous colloidal dispersions of alkali metal hydroxide and hydrocarbon to effect removal of sulfur compounds or other impurities. The hydroxide reagent may be prepared advantageously from a portion of the hydrocarbon which is to be treated or it may be formed from other hydrocarbons.

The colloidal dispersions of the alkali metal hydroxide and hydrocarbon for the treatment of the hydrocarbons may be prepared from either the hydroxide itself or from the metal. In preparing the colloidal dispersion from the hydroxide the hydroxide preferably is dissolved in water and then subjected to a dehydrating action. While it is not necessary to completely dehydrate the hydroxide in order to form the gel it is often preferable to dehydrate sufficiently to produce a substantially anhydrous material since frequently the dry or anhydrous hydroxide is desired for use. An effective method of dehydrating is to distill the aqueous hydroxide solution in the presence of an azeotrope former. Certain hydrocarbons, especially the lower molecular weight liquid aromatic hydrocarbons, are suitable for this purpose. When substantial dehydration has been accomplished a mixture of hydrocarbon and hydroxide remains. The peptizing agent is then added to form the homogeneous colloidal hydroxide-hydrocarbon dispersion.

In one method of preparing the treating gel the aqueous alkali metal hydroxide is subjected to azeotropic distillation with a good azeotrope former such as an aromatic hydrocarbon and the aromatic hydrocarbon as well as the water is distilled from the hydroxide. Another type of hydrocarbon such as a paraffin hydrocarbon is then added to the hydroxide together with the peptizing agent and the hydroxide is colloidally dispersed in the added hydrocarbon. This procedure is of special value when the final hydrocarbon in the product is in itself a poor azeotrope former.

If desired the peptizing agent may be added to the aqueous alkali metal hydroxide and hydrocarbon and the mixture subjected to simultaneous distillation or dehydration and colloidal dispersion of the hydroxide in hydrocarbon. On the other hand, the peptizing agent may be added at the completion of the distillation or dehydration.

The formation of the gel or homogeneous colloidal hydroxide-hydrocarbon dispersion with the aid of the peptizing agent may be accomplished at temperatures approximating the temperatures suitable for the distillation or dehydration and is preferably accompanied with stirring or agitation.

In preparing the colloidal dispersion from the metal the sodium or potassium is reacted with water, preferably in the presence of hydrocarbon, to form the hydroxide. Any excess water is removed and a colloidal dispersion of hydroxide and hydrocarbon is formed with the aid of a peptizing agent.

In one example in which the colloidal dispersion of metallic hydroxide and hydrocarbon was prepared from the metal, 30 parts by weight of xylene and 1¼ parts of metallic sodium were charged to a still provided with a reflux condenser. Heat was applied until the sodium was in a liquid state. While the heating was continued and the contents of the still subjected to vigorous stirring, water was gradually added until there was about 5% excess over that required for making the hydroxide. The heating and stirring were continued with refluxing until the sodium was completely reacted. A sample of the caustic in xylene was withdrawn from the still and a small quantity of aluminum stearate was added. The mixture was heated and, at the point where the xylene-water azeotrope started to distill, a gel was formed. Another sample of the caustic in xylene was withdrawn from the still and the mixture was heated to the boiling point of the xylene-water azeotrope. Upon the addition of a small quantity of aluminum stearate a gel formation immediately began. Both gels became more fluid upon cooling. The remainder in the still was then subjected to further distillation to remove the excess water remaining. The distillation was continued until the distillate was no longer cloudy, indicating that the excess water had been removed. Upon the addition of a small portion of aluminum stearate a homogeneous gel was obtained which upon analysis had a NaOH normality of 2.67. The gel was characterized by being more fluid after cooling but nevertheless of stable character at atmospheric temperatures.

In a number of examples the colloidal dispersion of metallic hydroxide and hydrocarbon was prepared from the hydroxide. Sufficient water was added to dissolve the caustic soda, the hydrocarbon was added and the mixtures were dried by distillation with refluxing through a trap. The water-hydrocarbon azeotrope was condensed in the reflux condenser and collected in the trap in which the azeotrope separated into its constituent parts, the separated water being removed and the hydrocarbon returned to the still. In each case a small amount of stearic acid was added to the dried hydroxide-hydrocarbon residue which caused a clear gel to form. The following mixtures were treated in this manner:

Example 1

40 parts xylene
5 parts sodium hydroxide
1 part stearic acid

Example 2

65 parts xylene
3.75 parts sodium hydroxide
1 part stearic acid

Example 3

400 parts kerosene
5 parts sodium hydroxide
1 part stearic acid

Example 4

40 parts kerosene
2.75 parts sodium hydroxide
1 part stearic acid

Example 5

35 parts iso-octane
5 parts sodium hydroxide (anhydrous xylene suspension)
1 part stearic acid

Example 6

35 parts iso-octane
2.5 parts sodium hydroxide (anhydrous xylene suspension)
1 part stearic acid

Example 7

45 parts turpentine
5 parts sodium hydroxide
1 part stearic acid

In Examples 5 and 6 with the iso-octane, since it was realized that dehydration with this hydrocarbon would be slow, a dry sodium hydroxide was first prepared with xylene and the xylene was completely removed resulting in the formation of an extremely fine powdered caustic soda. The iso-octane and stearic acid were then added and upon heating to the boiling point a stable gel was formed.

The gels of Examples 1–6 had the characteristic of being more fluid with decreasing temperatures. The gels formed with the turpentine in Example 7 had the opposite characteristic of being more fluid with increasing temperatures. All these gels were stable at ordinary atmospheric temperatures.

Although it is considered that azeotropic distillation is perhaps the most practical method of dehydrating the hydroxide other dehydrating means may be employed such as vacuum distillation and fusion, and drying by means of desiccants or dehydrating agents such as sulfuric acid and anhydrous phosphoric acid. Alkali metal hydroxides obtained by these other methods are usually granular or "massive" in form. Commercial caustic soda is available in substantially anhydrous condition but is also granular in form. These granular hydroxides should be reduced to a suitable small size such as a powder by apparatus means such as by grinding in a colloid or ball mill prior to the step of colloidal dispersion with the hydrocarbon. The distillation or dehydration of aqueous alkali metal hydroxides in the presence of hydrocarbon affords an excellent method of forming the hydroxide in a finely divided condition adapted for colloidal dispersion with the peptizing agent.

It is preferable to prepare the gel or sol in a hydrocarbon oil that is not high in sulfur compounds or other impurities that may react with the hydroxide. In cases where the hydrocarbon contains harmful proportions of sulfur compounds the hydrocarbon may be treated with alkali metal hydroxide and the treating reagent, including the mercaptides or sulfides or other products of reaction, decanted from the hydrocarbon before using it for the preparation of the gel or sol.

The term homogeneous is used herein to characterize the reagent employed in the invention although it is realized that in the strictest sense a colloidal system is of necessity heterogeneous. The term homogeneous as used herein to apply to the colloidal dispersion of alkali metal hydroxide and hydrocarbon is, practically speaking, aptly descriptive since the reagent is clear, transparent, stable and of uniform character throughout in contrast to suspensions of finely divided material which are opaque, turbid and transient in character.

In treating the hydrocarbons with the colloidal dispersion of alkali metal hydroxide and hydrocarbon the reagent is intimately contacted with the hydrocarbon in any suitable manner and the treated hydrocarbon separated from the reagent containing products of reaction. It is found that the reagent and products of reaction settle very rapidly from the treated hydrocarbons. Thus, for example, in treating naphtha containing mercaptans with the colloidal dispersion of hydroxide and hydrocarbon the reagent and mercaptides settled so completely from the treated naphtha that no residual alkalinity was detectable in the naphtha.

By way of example as showing the improved efficiency of treating hydrocarbon oil with the novel reagents prepared as described herein, a comparison was made between treating the oil with ordinary aqueous caustic soda and with the colloidal dispersion of sodium hydroxide and xylene. In this comparison a sour West Texas naphtha was treated with each of these reagents and it was found that the caustic soda gel in xylene removed 67% more of the mercaptans than did the ordinary aqueous sodium hydroxide.

The alkali metal hydroxide hydrocarbon gel is found to be much more effective in the removal of odorous compounds from hydrocarbon oil than is the ordinary aqueous alkali metal hydroxide.

Although a preferred embodiment of the invention has been described herein, it will be understood that various changes and modifications may be made therein, while securing to a greater or less extent some or all of the benefits of the invention, without departing from the spirit and scope thereof.

I claim:

1. The method of treating hydrocarbons containing impurities reactive with alkali metal hydroxide that comprises intimately contacting such hydrocarbons with a reagent in the form of a peptized colloidal system of alkali metal hydroxide and hydrocarbon in homogeneous colloidal dispersion with a hydrocarbon oil-soluble metallic salt of an organic acid as the peptizing agent.

2. The method of treating hydrocarbons containing impurities reactive with alkali metal hydroxide that comprises intimately contacting such hydrocarbons with a reagent in the form of a peptized colloidal system of alkali metal hydroxide and hydrocarbon oil in homogeneous colloidal dispersion with a metallic salt of a high molecular weight fatty acid as the peptizing agent.

3. The method of treating hydrocarbons containing impurities reactive with alkali metal hydroxide that comprises intimately contacting such hydrocarbons with a reagent in the form of a colloidal system of the class of sols and gels of alkali metal hydroxide and hydrocarbon oil in homogeneous colloidal dispersion.

4. The method of treating hydrocarbons containing impurities reactive with alkali metal hydroxide that comprises intimately contacting such hydrocarbons with a reagent in the form of a substantially anhydrous colloidal system of the class of sols and gels of alkali metal hydroxide and hydrocarbon oil in homogeneous colloidal dispersion.

5. The method of treating hydrocarbons containing impurities reactive with alkali metal hydroxide that comprises intimately contacting such hydrocarbons with a reagent in the form of a peptized colloidal system of the class of sols and gels of alkali metal hydroxide and hydrocarbon oil colloidally dispersed with a peptizing agent.

6. The method of treating hydrocarbons containing impurities reactive with alkali metal hydroxide that comprises intimately contacting such hydrocarbons with a reagent in the form of a colloidal system of the class of sols and gels of alkali metal hydroxide and hydrocarbon oil in homogeneous colloidal dispersion and separating the resultant products of reaction from the treated hydrocarbons.

LUDWIG ROSENSTEIN.

REFERENCES CITED

The following references are of record in the file of this patent:

UNITED STATES PATENTS

| Number | Name | Date |
| --- | --- | --- |
| 1,770,287 | Pelzer | July 8, 1930 |
| 1,801,412 | Carlisle | Apr. 21, 1931 |
| 1,970,583 | Stagner | Aug. 21, 1934 |
| 2,031,972 | Moser | Feb. 25, 1936 |
| 2,311,593 | Kalichevsky et al. | Feb. 16, 1943 |
| 2,347,515 | Schmidt | Apr. 25, 1944 |